(12) United States Patent
Peto (10) Patent No.: US 8,193,785 B2
(45) Date of Patent: Jun. 5, 2012

(54) POWER SUPPLY

(75) Inventor: Raymond John Peto, Puncknowle (GB)

(73) Assignee: Microgen Engine Corporation Holding B.V. (NL)

( * ) Notice: Subject to any disclaimer, the term of this patent is extended or adjusted under 35 U.S.C. 154(b) by 588 days.

(21) Appl. No.: 12/087,147

(22) PCT Filed: Dec. 28, 2006

(86) PCT No.: PCT/GB2006/004952
§ 371 (c)(1),
(2), (4) Date: Mar. 2, 2009

(87) PCT Pub. No.: WO2007/077433
PCT Pub. Date: Jul. 12, 2007

(65) Prior Publication Data
US 2009/0167268 A1    Jul. 2, 2009

(30) Foreign Application Priority Data

Dec. 30, 2005   (GB) .................................. 0526625.9

(51) Int. Cl.
*G05F 1/613* (2006.01)
*G05F 1/00* (2006.01)

(52) U.S. Cl. ......... 323/224; 323/283; 323/230; 323/231

(58) Field of Classification Search ........... 323/224.283, 323/230, 231
See application file for complete search history.

(56) References Cited

U.S. PATENT DOCUMENTS

| | | | |
|---|---|---|---|
| 4,238,723 A | 12/1980 | Jenks | 323/24 |
| 4,311,955 A | 1/1982 | Murakami et al. | 323/300 |
| 4,456,855 A | 6/1984 | Sairanen et al. | 315/308 |
| 4,680,490 A | 7/1987 | Baker et al. | 307/375 |
| 5,025,372 A | 6/1991 | Burton | 364/406 |
| 5,381,327 A | 1/1995 | Yan | 363/24 |
| 5,424,685 A | 6/1995 | Mitchell | 330/279 |
| 5,822,200 A | 10/1998 | Stasz | 363/21 |
| 5,847,555 A | 12/1998 | Lewis | 323/299 |
| 5,932,934 A | 8/1999 | Hofstetter et al. | 307/26 |
| 6,051,961 A * | 4/2000 | Jang et al. | 323/224 |
| 6,320,358 B2 * | 11/2001 | Miller | 323/222 |
| 6,434,058 B2 | 8/2002 | Kanazashi | 365/189.7 |

(Continued)

FOREIGN PATENT DOCUMENTS

DE        37 05 866        9/1988

(Continued)

OTHER PUBLICATIONS

U.S. Appl. No. 12/087,226, filed Jun. 27, 2008, Peto.

(Continued)

*Primary Examiner* — Shawn Riley
(74) *Attorney, Agent, or Firm* — Ballard Spahr LLP (57) ABSTRACT

A switching regulator for regulating an ac signal, and method of supplying power thereto wherein the regulator includes a positive half cycle part and a negative half-cycle part arranged to regulate the respective parts of an input ac signal. Each half-cycle part includes a modulating transistor, having an associated modulator diode, and a clamping diode arranged to protect the modulating transistor from reverse-bias voltages and having an associated clamp switch. The regulator further has a first switching controller operable to cause the modulating transistors to switch and a second, separate switching controller operable to cause the clamp switches to switch.

23 Claims, 7 Drawing Sheets

U.S. PATENT DOCUMENTS

| | | | | |
|---|---|---|---|---|
| 7,060,954 | B2 | 6/2006 | Kitaizumi | 219/715 |
| 7,886,985 | B2 | 2/2011 | Moore | 236/46 C |
| 2003/0015875 | A1 | 1/2003 | Fukaya | 290/40 C |
| 2004/0119448 | A1 | 6/2004 | Wiegand et al. | 323/223 |
| 2005/0002214 | A1 | 1/2005 | Deng | 363/95 |
| 2006/0132104 | A1 | 6/2006 | Li | 323/207 |
| 2006/0158912 | A1 | 7/2006 | Wu | 363/89 |
| 2006/0192774 | A1 | 8/2006 | Yasumura | 363/24 |
| 2006/0238142 | A1 | 10/2006 | Bai | 315/291 |
| 2007/0097718 | A1 | 5/2007 | Nahar | 363/65 |

FOREIGN PATENT DOCUMENTS

| | | |
|---|---|---|
| DE | 19742609 | 7/1998 |
| EP | 0631372 | 12/1994 |
| EP | 1974447 | 10/2008 |
| EP | 1974448 | 10/2008 |
| EP | 1974466 | 10/2008 |
| GB | 1 510 644 | 5/1978 |
| GB | 2 100 481 | 12/1982 |
| GB | 2 320 967 | 7/1998 |
| GB | 0526625.9 | 12/2005 |
| JP | 55-057923 | 4/1980 |
| JP | 08-308226 | 11/1996 |
| JP | 09-149648 | 6/1997 |
| JP | 10-248245 | 9/1998 |
| JP | 2003-230277 | 8/2003 |
| JP | 2003-348843 | 12/2003 |
| JP | 2009522992 | 6/2009 |
| JP | 2009522993 | 6/2009 |
| JP | 2009522994 | 6/2009 |
| KR | 20080085900 | 9/2008 |
| KR | 20080087877 | 10/2008 |
| KR | 20080094671 | 10/2008 |
| WO | PCT/GB2003/001200 | 10/2003 |
| WO | PCT/GB2006/004952 | 12/2006 |
| WO | WO/2007/007433 | 12/2006 |
| WO | WO/2007/077426 | 12/2006 |
| WO | WO/2007/077434 | 7/2007 |

OTHER PUBLICATIONS

U.S. Appl. No. 12/087,211, filed Jun. 26, 2008, Peto.

Search Report under Section 17(5) mailed on Apr. 21, 2006 by the U.K. Patent Office for Application No. GB0526635.8 filed on Dec. 30, 2005 (Applicant—Microgen Energy Ltd. // Inventor—Raymond John Peto) (3 pages).

European Patent Office Standard Search Report mailed on Aug. 16, 2006 for Application No. GB0526635.8 filed on Dec. 30, 2005 (Applicant—Microgen Energy Ltd. // Inventor—Raymond John Peto) (3 pages).

International Search Report issued on Apr. 25, 2008 by the International Searching Authority for PCT/GB2006/004953 filed on Dec. 28, 2006 and Published as WO/2007/077434 on Jul. 27, 2007 (Applicant—Microgen Energy Ltd. // Inventor—Raymond John Peto) (4 pages).

Written Opinion of the International Searching Authority issued on Apr. 25, 2008 for PCT/GB2006/004953 filed on Dec. 28, 2006 and Published as WO/2007/077434 on Jul. 12, 2007 (Applicant—Microgen Energy Ltd. // Inventor—Raymond John Peto) (9 pages).

International Preliminary Report on Patentability issued on Jul. 1, 2008 by the International Bureau for PCT/GB2006/004953 filed on Dec. 28, 2006 and published as WO/2007/077434 on Jul. 12, 2007 (Applicant—Microgen Energy Ltd. // Inventor—Raymond John Peto) (10 pages).

Claims amendment mailed Sep. 23, 2008 for European Patent Office Application No. 06831504.3 filed on Dec. 28, 2006 and Published as EP1974466 on Jul. 12, 2007 (Applicant—Microgen Energy Ltd. // Inventor—Raymond John Peto) (18 pages).

European Patent Office Examination Report mailed Mar. 11, 2010 for Application No. 06831504.3 filed on Dec. 28, 2006 and Published as EP1974466 on Jul. 12, 2007 (Applicant—Microgen Energy Ltd. // Inventor—Raymond John Peto) (6 pages).

Response mailed Sep. 14, 2010 to the European Patent Office Examination Report of Mar. 11, 2010 for Application No. 06831504.3 filed on Dec. 28, 2006 and Published as EP1974466 on Jul.12, 2007 (Applicant—Microgen Energy Ltd. // Inventor—Raymond John Peto) (23 pages).

International Preliminary Report on Patentability issued on Jul. 1, 2008 by the International Bureau for PCT/GB2006/004952 filed on Dec. 28, 2006 and Published as WO/2007/077426 on 07/12/07 (Applicant—Microgen Energy Ltd. // Inventor—Raymond John Peto) (9 pages).

Claims amendment mailed Sep. 23, 2008 for European Patent Office Application No. 06831503.5 filed on Dec. 28, 2006 and Published as EP1974448 on Jul. 12, 2007 (Applicant—Microgen Engine Corp. Holding Bv // Inventor—Raymond John Peto) (10 pages).

European Patent Office Examination Report mailed Mar. 11, 2010 for Application No. 06831503.5 filed on Dec. 28, 2006 and Published as EP1974448 on Jul. 12, 2007 (Applicant—Microgen Engine Corp. Holding BV // Inventor—Raymond John Peto) (5 pages).

Response mailed Sep. 14, 2010 to the European Patent Office Examination Report of Mar. 11, 2010 for Application No. 06831503.5 filed on Dec. 28, 2006 and Published as EP1974448 on Jul. 12, 2007 (Applicant—Microgen Engine Corp. Holding BV // Inventor—Raymond John Peto) (15 pages).

Search Report under Section 17(5) mailed on Apr. 21, 2006 by the U.K. Patent Office for Application No. GB0526626.7 filed on Dec. 30, 2005 (Applicant—Microgen Energy Ltd. // Inventor—Raymond John Peto) (3 pages).

European Patent Office Standard Search Report mailed on Aug. 16, 2006 for Application No. GB0526626.7 filed on Dec. 30, 2005 (Applicant—Microgen Energy Ltd. // Inventor—Raymond John Peto) (3 pages).

International Search Report issued on Apr. 17, 2008 by the International Searching Authority for PCT/GB2006/004929 filed on Dec. 28, 2006 and Published as WO/2007/077426 on Jul. 12, 2007 (Applicant—Microgen Energy Ltd. // Inventor—Raymond John Peto) (4 pages).

Written Opinion of the International Searching Authority issued on Apr. 17, 2008 for PCT/GB2006/004929 filed on Dec. 28, 2006 and Published as WO/2007/077426 on Jul. 12, 2007 (Applicant—Microgen Energy Ltd. // Inventor—Raymond John Peto) (8 pages).

International Preliminary Report on Patentability issued on Jul. 1, 2008 by the International Bureau for PCT/GB2006/004929 filed on Dec. 28, 2006 and Published as WO/2007/077426 on Jul. 12, 2007 (Applicant—Microgen Energy Ltd. // Inventor—Raymond John Peto) (9 pages).

Claims amendment mailed Sep. 24, 2008 for European Patent Office Application No. 06831480.6 filed on Dec. 28, 2006 and Published as EP1974447 on Jul. 12, 2007 (Applicant—Microgen Engine Corp. Holding Bv // Inventor—Raymond John Peto) (12 pages).

European Patent Office Examination Report mailed Mar. 11, 2010 for Application No. 06831480.6 filed on Dec. 28, 2006 and Published as EP1974447 on Jul. 12, 2007 (Applicant—Microgen Engine Corp. Holding BV // Inventor—Raymond John Peto) (3 pages).

Response mailed Jul. 20, 2010 to the European Patent Office Examination Report of Mar. 11, 2010 for Application No. 06831480.6 filed on Dec. 28, 2006 and Published as EP1974447 on Jul. 12, 2007 (Applicant—Microgen Engine Corp. Holding BV // Inventor—Raymond John Peto) (15 pages).

Non-final rejection mailed Oct. 21, 2011 for U.S. Appl. No. 12/087,211, filed on Feb. 9, 2009 and Published as U.S. 2009/0224738 on Sep. 10, 2009 (Inventor—Raymond John Peto) (25 pages).

Preliminary Amendment filed Jun. 26, 2008 for U.S. Appl. No. 12/087,211, filed on Feb. 9, 2009 and Published as U.S. 2009/0224738 on Sep. 10, 2009 (Inventor—Raymond John Peto) (11 pages).

Non-final rejection mailed Nov. 25, 2011 for U.S. Appl. No. 12/087,226, filed on Feb. 9, 2009 and Published as U.S. 2009/0189589 on Jul. 30, 2009 (Inventor—Raymond John Peto) (21 pages).

Preliminary Amendment filed Jun. 27, 2008 for U.S. Appl. No. 12/087,226, filed on Feb. 9, 2009 and Published as U.S. 2009/0189589 on Jul. 30, 2009 (Inventor—Raymond John Peto) (8 pages).

Response to Non-final Rejection filed Jan. 23, 2012 for U.S. Appl. No. 12/087,211, filed on Feb. 9, 2009 and Published as U.S. 2009/0224738 on Sep. 10, 2009 (Inventor—Raymond John Peto) (4 pages).

Letter of Express Abandonment filed Mar. 8, 2012 for U.S. Appl. No. 12/087,211, filed on Feb. 9, 2009 and Published as U.S. 2009/0224738 on Sep. 10, 2009 (Inventor—Raymond John Peto) (4 pages).

* cited by examiner

POWER SUPPLY

CROSS-REFERENCE TO RELATED APPLICATIONS

The present application is a National Phase Application of International Application No. PCT/GB2006/004952, filed Dec. 28, 2006, which claims priority to Great Britain Patent Application No. 0526625.9 filed Dec. 30, 2005, which applications are incorporated herein fully by this reference.

FIELD OF THE INVENTION

The present invention relates to a power supply that receives power from an ac source and provides at least two output signals. The output signals may be supplied, for example, to a switching regulator that regulates an ac signal. The switching regulator may find application in, for example, a domestic combined heat and power (dchp) generator that produces an ac signal that may require regulating prior to supply to either connected appliances or to an electrical grid.

BACKGROUND OF THE INVENTION

There are many situations where a generated ac signal requires regulating before it can be used elsewhere. The regulation may control frequency, voltage or current and may include control of voltage and current transients and steady state variations that may otherwise cause fluctuations in the ac waveform to be used elsewhere.

To provide a context for the present invention an intended application for the present invention will be described. This application is in dchp units that provide hot water and central heating in a domestic environment. Our International Patent Application No. PCT/GB03/001200 describes such a dchp unit comprising a Stirling engine. These dchp units are beneficial as, in addition to meeting a household's central heating and hot water requirements, they can also be used to generate electricity in an energy-efficient manner. The electricity so generated can be used either within the household or it may be sold back into the electrical grid supplying the household.

The electricity generated by the dchp unit must be tightly regulated to be suitable for supply onto a mains electrical grid. In addition, regulation is also usually required to suit the demands of domestic appliances connected to the dchp unit.

Figure 1:
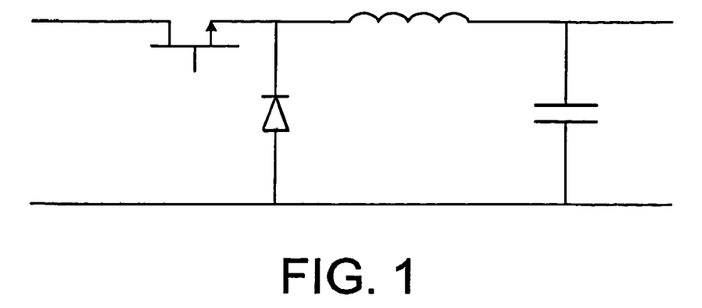
FIG. 1 is a circuit diagram of known Buck regulator.

FIG. 1 shows the well-known Buck regulator that may be used to regulate a DC waveform. The regulator comprises a transistor that is switched, normally according to a pulse width modulation scheme, to provide a desired average output voltage. The inductor and capacitor smooth the pulsed output to leave only a minimal ripple on the DC voltage signal provided at the output. The regulator also includes a diode provided to act as a clamping diode (also known as a "flyback diode") to protect the transistor from large reverse voltages generated by the inductor as it tries to maintain current flow when the transistor is switched off.

Figure 2:
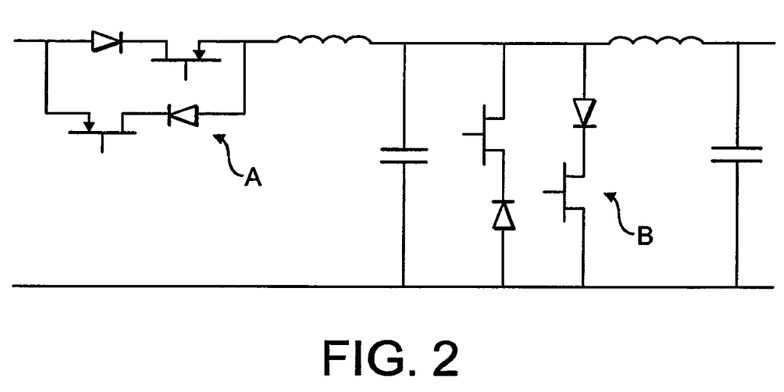
FIG. 2 is a circuit diagram of a known ac regulator that essentially combines two Buck regulators.

A pair of Buck regulators may be combined to provide a regulator for an ac supply. FIG. 2 reproduces such a regulator that is disclosed in EP-A-0,631,372. The regulator converts an ac input to provide a variable voltage dc output to power lights operated from a dimmer switch. A pair of transistors with associated diodes are provided, as indicated at A in FIG. 2, with one transistor modulating the positive half-cycle of the ac input and the other transistor modulating the negative half-cycle of the ac input. A pair of clamping diodes are provided, as indicated at B in FIG. 2, one for each half-cycle and biased appropriately, that are switched in and out of the circuit for the appropriate half-cycles by associated transistors. Thus, both positive and negative half-cycles are pulse width modulated, and the resulting output is smoothed by the inductors and capacitors.

SUMMARY OF THE INVENTION

Against this background, and from a first aspect, the present invention resides in a switching regulator for regulating an ac signal. The regulator is provided with input terminals for receiving an ac input signal and output terminals for providing an output signal. An inductor and a capacitor are provided such that they operate to smooth the signal passing through the regulator thereby providing a smoothed output signal at the output terminals. The regulator operates separately on the positive and negative half-cycles of the ac input signal and so is provided with a positive half-cycle part and a negative half-cycle part.

Each of the positive and negative half-cycle parts include the following components. A modulating transistor is provided that is operable to modulate its respective half-cycle of the input ac signal. The modulating transistor is provided with an associated modulator diode that is arranged to allow current flow through the modulating transistor during that modulating transistor's respective half-cycle and to resist current flow through the modulating transistor during the other half-cycle. Thus, the modulator diode ensures that the modulating transistor may operate on the correct respective half-cycle of the ac input signal. Generally, the modulator diodes of the two half-cycle parts will be biased oppositely.

Each of the positive and negative half-cycle parts further comprises a clamping diode arranged to protect the modulating transistor from reverse-bias voltages. The clamping diode is provided with an associated clamp switch operable to connect the clamping diode into the regulator during that modulating transistor's respective half-cycle and to disconnect the clamping diode from the regulator during the other half-cycle. Thus, the clamping diode is only active during the required half-cycle.

The regulator further comprises a first switching controller operable to cause the modulating transistors to switch and a second switching controller operable to cause the clamp switches to switch. The first and second switching controllers are separate. Accordingly, control of the modulating transistors may be effected independently of control of the clamp switches.

Preferably, the regulator operates using pulse width modulation of the ac input signal to provide the required output signal. This may be achieved by arranging the first switching controller to cause the modulating transistors to switch in accordance with a pulse width modulation scheme.

The modulator diodes may be arranged to provide a shunt around their associated modulating transistor as this provides a simple arrangement to bypass each of the respective modulating transistors during the half-cycle where the modulating transistor is not required to work.

Transistors are preferably used as the clamp switches. Optionally, the clamp transistors are arranged on respective shunts. Thus, when the clamp transistors are conducting, their associated clamping diode is bypassed such that the clamping diode may be switched out of the regulator during the half-cycle for which it would be incorrectly biased.

Preferably, the first switching controller includes a power supply that is operable to take power from the input ac signal. A corresponding arrangement may be used for the second switching controller, either alone or in combination with the power supply for the first switching controller. When used in combination, a first power supply may be provided for the first switching controller that is arranged to take power from one half-cycle of the input ac signal. A second power supply may be provided for the second switching controller that is arranged to take power from the other half-cycle of the input ac signal. This may be achieved by providing oppositely-biased diodes arranged to allow only either the positive or the negative half-cycle of the input ac signal to flow to the first and second power supplies respectively.

Preferably, the first and second power supplies are arranged to obtain substantially equal average quantities of power from the input ac signal. Thus, the power requirement across the whole ac cycle of the input signal is balanced and so the integrity of the input signal is only minimally affected, if at all. The modulating transistors and the clamp switches may have very different current requirements, for example because of different switching frequencies. As a consequence, the first and second power supplies may be arranged to provide substantially different instantaneous currents. This means that it is likely the power supplies will have to decrease the voltage of the signal drawn from the input ac signal, and so they may be arranged to do this. For example, one or both the power supplies may comprise a switch operable to decrease the voltage. Alternatively, the voltage may be capped at a desired voltage using an appropriately-biased Zener diode. Preferably, one or both power supplies are operable to provide a smoothed power signal. This may be conveniently achieved by providing one or both power supplies with smoothing components such as an inductor and/or a capacitor. Furthermore, one or more capacitors may be provided in one or both power supplies that are arranged to store energy during one half-cycle and to release energy during the other half-cycle. In order to provide a desired current, one or both power supplies may be provided with appropriately-rated resistors.

From a second aspect, the present invention resides in a method of providing power to any of the above described switching regulators, comprising powering the first switching controller by drawing power from one half-cycle of the input ac signal; and powering the second switching controller by drawing power from the other half-cycle of the input ac signal; wherein the average power drawn during each half-cycle is substantially the same. The method may further comprise using the first switching controller to provide current to the modulating transistors, and using the second switching controller to provide current to the clamp switches, wherein the instantaneous currents provided by the first and second switching controllers are substantially different.

BRIEF DESCRIPTION OF THE DRAWINGS

In order that the present invention may be more readily understood, preferred embodiments will now be described, by way of example only, with reference to the accompanying drawings in which:

FIG. 13b is a schematic diagram of an implementation of the method of FIG. 13a.

DETAILED DESCRIPTION OF THE INVENTION

Figure 3:
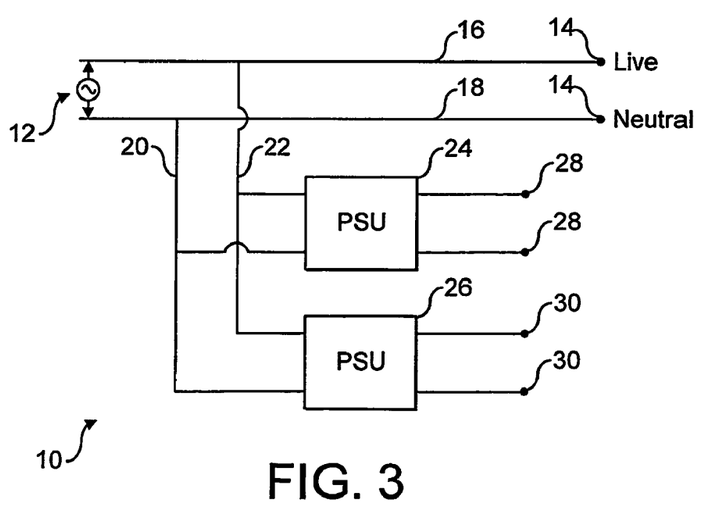
FIG. 3 is a block diagram of a power supply comprising first and second power supply units.

FIG. 3 shows a power supply 10 that draws power from an input ac signal 12. The input ac signal 12 is also provided to a pair of output terminals 14 to which other components or circuits may be connected. The power supply 10 draws power from live and neutral lines 16,18 comprising the input ac signal 12 via lines 20,22. These lines 20,22 divide so as to provide power to a first power supply unit (PSU) 24 and a second PSU 26.

The first and second PSU's 24,26 are configured to draw power during opposed halves of the input ac signal 12, i.e. first PSU 24 draws power during the positive half-cycles of the input ac signal 12 and the second PSU 26 draws power during the negative half-cycles or vice versa. This may easily be implemented using appropriately biased diodes, for example.

The first and second PSU's 24,26 are configured to ensure that power is drawn evenly from the positive half-cycles as compared to the negative half-cycles. This minimises the effect seen on the input ac signal 12 appearing at the output terminal 14, such as any distortion. Furthermore the first and second PSU's 24,26 are configured to modify the signal they receive so as to provide output signals having different instantaneous currents to their respective output terminals 28,30. The signals the first and second PSU's provide may be dc or may be ac, as required. Further components or circuitry may be connected to the PSU output terminals 28,30 that may be separate or part of circuitry connected to output terminals 14.

Specific examples of the PSU's 24,26 are provided in the description below, along with a specific application where the power supply 10 may be used.

Regulator Assembly

Figure 4:
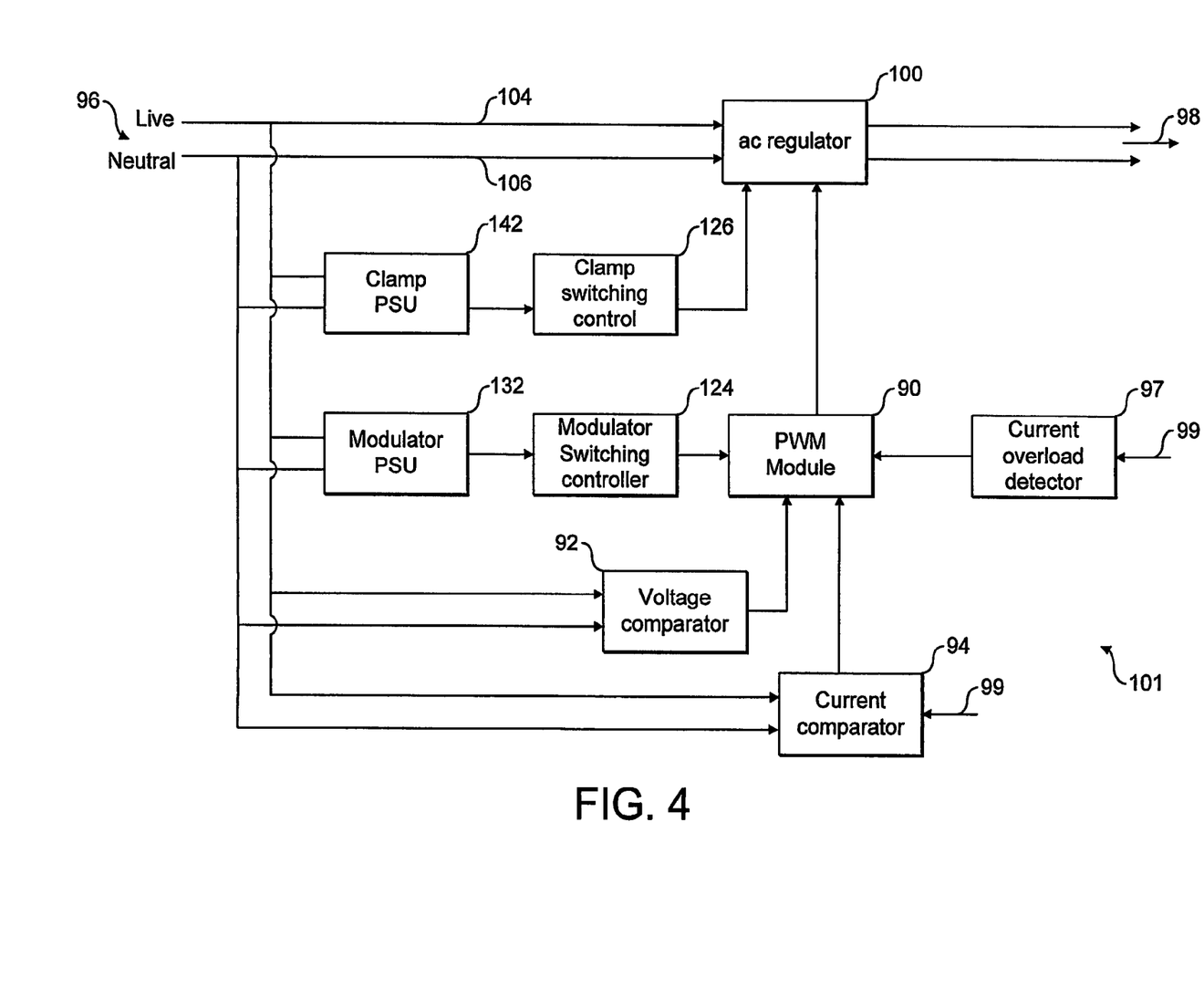
FIG. 4 is a block diagram of a regulator operable to receive an ac input signal and produce an ac output signal.

FIG. 4 shows, in block form, a regulator assembly 101 that includes parts suitable for implementing the present invention. As can be seen at 96, an ac input signal is received on live and neutral lines 104,106 that are passed to an ac regulator 100. The ac input signal may be floating, i.e. it may not necessarily be referenced to ground. The ac regulator 100 performs the actual regulation of the ac input signal and is operated under the control of the other parts of the regulator assembly 101 shown in FIG. 4.

As will become clearer from the following description, the ac regulator 100 comprises four transistors; two switching to modulate the ac signal thereby regulating the ac input signal, and two that switch to allow clamp diodes to become effective to protect the modulating transistors. The clamp transistors operate as controlled by a clamp switching controller 126 that is powered by a clamp power supply unit (PSU) 142 that in turn draws its power from the ac input signal.

Similarly, the modulating transistors have an associated modulator switching controller 124 powered by a modulator PSU 124 that draws power from the ac input signal.

The modulator switching controller 124 merely switches operation between a pair of modulating transistors to allow one or the other modulating transistor to operate. The actual switching of each modulating transistor is controlled according to a pulse width modulation (PWM) scheme. Accordingly, a PWM module 90 receives a signal from the modulator switching controller 124 that will allow one or the other (or neither) modulating transistor to operate. The PWM module 90 also receives signals from a voltage comparator 92 and a current comparator 94.

The voltage comparator 92 references the ac input signal and operates to effect modulation of the ac input signal to control the voltage of the ac output signal. The current comparator 94 also references the ac input signal, but also receives a signal 99 that is indicative of the current flowing through one or more loads connected to the regulator assembly 101. The current comparator 94 operates to effect modulation of the ac input signal to control the current provided to the load.

The regulator assembly 101 may operate in one of two modes: a voltage control mode under the management of the voltage comparator 92, or a current control mode under the management of the current comparator 94. The current drawn by the load may be monitored to determine which mode is used. Where normal currents are required, the voltage control mode may be used, i.e. the voltage comparator 92 controls the PWM module 90 that in turn controls the ac regulator 100. However, where excessive currents are required, the current control mode may be used (at least for short periods), i.e. the current comparator 94 controls the PWM module 90 that in turn controls the ac regulator 100. This is described in more detail in the following section.

In any event, there may be a limit provided by a current overload detector 97 that also receives the signal 99 that is indicative of the current flowing through one or more loads connected to the regulator assembly 101. If the current becomes too large, or an excessive current persists for too long, this may be interpreted as a short circuit and the current overload detector may operate to stop operation of the ac regulator 100. This may be achieved by the current overload detector 97 controlling the PWM module 90.

The regulator assembly 101 described above may be used to connect a generator such as a dchp generator to a grid or to connected appliances. For example, the regulator assembly 101 may form a bridge between the alternator of a dchp unit and an electrical grid and also local electrical appliances to ensure that the signal produced by the alternator is suitable for injection into the grid and/or supply to the connected appliances.

Voltage Control and Current Control

As mentioned above, a contemplated application for the present invention is in a Stirling engine in a dchp unit that produces an ac signal from its alternator. A particular requirement for such a low-inertia generators is to provide a suitable impedance across the generator terminals, irrespective of load demand. If the alternator senses too high or too low an impedance, this may result in over-voltage, in waveform distortion and, in extreme cases such as an open or short circuit condition, in physical damage to the generator.

The alternator is assured of being presented with a reasonably stable impedance when it is connected directly to an electrical mains. Furthermore, the alternator is protected against damaging faults and transients by monitoring circuits that are fitted in accordance with regulatory requirements. However, there is no inherent protection for the alternator when such a dchp unit is used to provide electrical energy to connected appliances when disconnected from the electrical mains, as in the case of a grid power blackout. Under these conditions, the load corresponding to the connected appliances that is connected across the electrical output of the alternator may vary from nothing up to the full rated output of the alternator. In fact, when appliances are first connected to the dchp unit, these loads may demand "inrush" currents greatly in excess of those normally provided by the alternator.

It is advantageous to ensure that such a low inertia generator is presented with a stable impedance under all load demand conditions, and this is implemented using the voltage and current control modes of operation. Also, the current control mode of operation provides a mechanism for accommodating the inrush current of an electrical appliance at first connection as described below.

In this embodiment, the ac input signal will have a nominal voltage and a maximum current. For example, the ac input signal may be produced by the alternator in a dchp unit operating to produce a 230V rms signal with a maximum current of 4.3 A.

The current drawn by the connected loads may be monitored to determine whether or not it exceeds that 4.3 A limit. While a current of 4.3 A or less is drawn, the regulator may operate in voltage control mode such that the waveform of the ac output signal is tightly controlled to follow the ideal sinusoid having an amplitude of 230V rms. In this mode, excess current may be dumped to a dump resistor such that the alternator sees a constant impedance.

However, in many situations a current of more than 4.3 A may be required. For example, if a toaster is connected to the regulator, it will demand a large current when first switched on. The cold heating elements may draw as much as 24 A initially. This large current demand may be sensed as a voltage drop as a capacitor in the ac regulator 100 discharges (and so is indicative of the current drawn), and so the regulator assembly 101 may change to current control mode.

In current control mode, a constant current is drawn from the alternator at the 4.3 A maximum. This power is supplied to an inductor in the ac regulator 100. The ac output signal derived form the inductor may have a voltage that is allowed to drop below 230V rms to ensure that the current rises above 4.3 A to meet the demand using the available power. Thus, the voltage is allowed to vary while the current comparator 94 operates to control the current drawn from the alternator at the maximum value while allowing higher currents to be delivered to the connected loads.

As with many situations, the toaster will only draw a large current for a short time period, while the heating elements are warming. When hot, the toaster will only require typically 2.4 A, well within the usual operating range of the regulator. Thus, operation may switch back to voltage control mode once the current demand drops below the maximum value of 4.3 A.

In fact, two different thresholds may be used to provide hysteresis that prevents hunting (i.e. repeated switching resulting from noise in the signal causing repeated crossings of the threshold). When operating in voltage control mode, a drop to 220V rms may be used to indicate a voltage drop large enough to indicate an excessive current demand and so cause a switch to current control mode. When operating in current control mode, a rise to 225V rms may be used to indicate that current demand is normal once more and to cause the switch to voltage control mode. Thus, when the voltage drops through the 220V rms threshold, noise fluctuations in the signal will be too small to cross the 225V rms threshold so that control is not inadvertently switched back to voltage mode prematurely. The 5V difference between thresholds is chosen as it is larger than expected noise variations. Similarly, an increase in voltage through the 225V rms threshold to change operation to voltage control requires a subsequent large drop to 220V rms before control is switched back to current mode, this drop again being too great to be bridged by noise in the signal.

The ac Regulator

Figure 5:
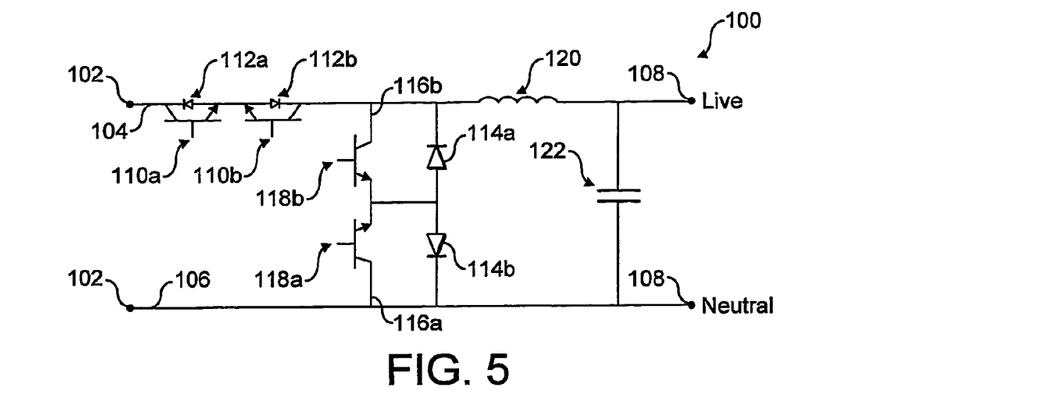
FIG. 5 is a circuit diagram of part of an ac regulator according to the present invention.

An ac regulator 100 with which the present invention may be used is shown in FIG. 5. The ac regulator 100 comprises a pair of input terminals 102 for connection to the ac source. In this embodiment, the input terminals 102 receive the output of an alternator of a Stirling engine operating in a dchp unit. The ac regulator 100 receives a nominal 240V ac signal as an input between live and neutral lines 104 and 106 respectively. The ac regulator 100 provides the desired ac output signal at a pair of output terminals 108. In this embodiment, the ac input from the dchp unit is regulated and subsequently distributed from the output terminals 108 to a number of connected domestic appliances that draw power from the dchp unit. In addition, the regulator 100 may provide the regulated ac signal for supply into an electrical mains supply.

Essentially, the ac regulator 100 comprises a combination of two Buck regulators. Accordingly, the ac regulator 100 comprises a pair of modulating transistors 110*a,b* that both operate to pulse width modulate the ac input signal to provide a desired signal as the ac output signal. Suitable PWM schemes and their implementation are well known in the art. The PWM may be performed to control the voltage or current of the ac output signal, as described elsewhere in this specification.

One of the transistors 110*a* modulates during the positive half-cycle of the ac input signal and the other transistor 110*b* modulates during the negative half-cycle. To allow this method of operation, the transistors 110*a,b* are arranged in series and each transistor 110*a,b* has an associated shunt provided with a modulator diode 112*a,b*. The two modulator diodes 112*a,b* are oppositely biased such that modulating transistor 110*b* is bypassed for the positive half-cycle of the ac input signal and modulating transistor 110*a* is bypassed for the negative half-cycle.

A pair of clamping diodes 114*a,b* are also provided, biased oppositely such that diode 114*a* may act as a clamping diode during the positive half-cycle and diode 114*b* may act as a clamping diode during the negative half-cycle. Switched shunts 116*a,b* are provided to allow each clamping diode 114*a,b* to be bypassed during the half-cycle for which it is not required to work. Switches are provided by a pair of transistors 118*a,b*, herein after referred to as clamp transistors 118*a,b* to distinguish them from the modulating transistors 110*a,b* described above.

An inductor 120 and a capacitor 122 are provided to smooth the signal provided by the modulating transistors 110*a,b* thereby providing the required output signal at the output terminals 108.

The regulator 100 may be operated as follows.

During the positive half-cycle of the ac input signal, current flows from the live line 104 and is blocked by modulator diode 112*a* such that the current must flow through modulating transistor 110*a* where it is gated according to the pulse width modulating scheme. Current then bypasses modulating transistor 110*b* (that is switched off) along the shunt through modulator diode 112*b*. The emergent current then flows to inductor 120 and capacitor 122 that operate to smooth the current flow seen at the output terminals 108. Clamping diode 114*a* protects the modulating transistor 110*a* from reverse voltages when the inductor 120 tries to maintain current flow. This is because clamp transistor 118*a* is switched on to bypass clamping diode 114*b*, and clamp transistor 118*b* is switched off. This ensures the only current path is from the neutral line 106 to the live line 104 via the shunt 116*a* provided through clamp transistor 118*a* and then through clamping diode 114*a*.

During the negative half-cycle of the ac input signal, current flow is accomplished from the neutral line 106 to the live line 104 via modulating transistor 110*b*. Modulator diode 112*b* blocks current flow so that current must pass through the modulating transistor 110*b* where it is gated according to the pulse width modulating scheme. Current bypasses modulating transistor 110*a* (that is switched off) along the shunt through modulator diode 112*a*. Again, the inductor 120 and the capacitor 122 operate to smooth the current flow seen at the output terminals 108. This time, the other clamping diode 114*b* protects the modulating transistor 110*b* when the inductor 120 tries to maintain current flow. This is because clamp transistor 118*b* is switched on to bypass clamping diode 114*a*, and clamp transistor 118*a* is switched off. This ensures the only current path is from the live line 104 to the neutral line 106 via the shunt 116*b* provided through clamp transistor 118*b* and then through clamping diode 114*b*.

The Switching Controllers

Figure 6:
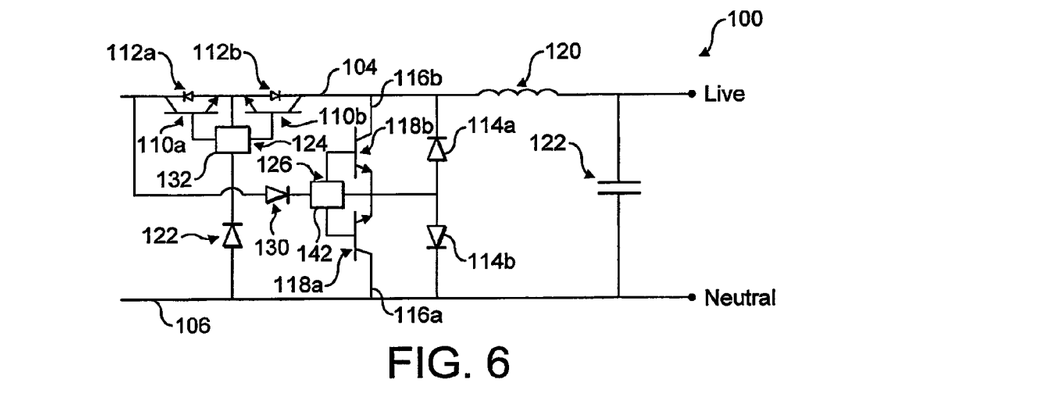
FIG. 6 is a circuit diagram of an ac regulator according to the present invention, including the circuit of FIG. 5 and also showing associated switching controllers.

FIG. 6 shows the regulator of FIG. 5, but also shows the modulator switching controller 124 associated with the modulating transistors 110*a,b* and the clamp switching controller 126 associated with the clamp transistors 118*a,b*.

The switching controllers 124, 126 require power that may be supplied from associated power supply units (PSU's) 132, 142 (not shown separately in FIG. 6). Further details of the PSU's are provided in the following section.

Figure 7:
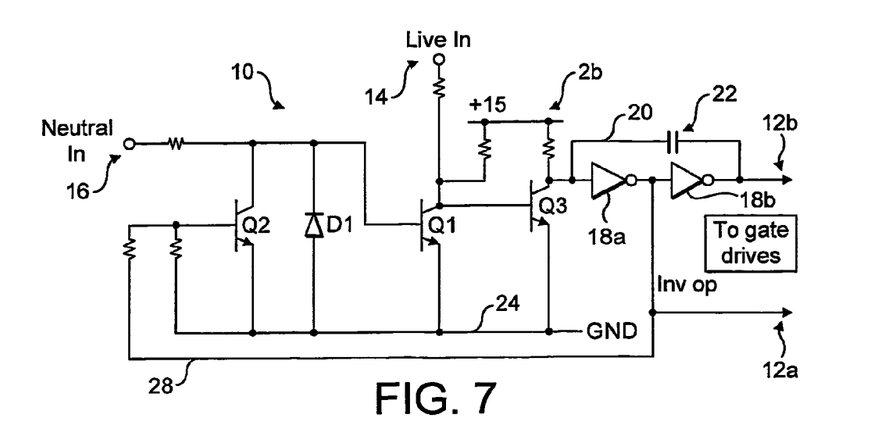
FIG. 7 is a circuit diagram of a driver circuit for supplying first and second gate drive signals.

FIG. 7 shows a general driver circuit 10 for providing a pair of gate drive signals at output terminals 12*a,b* that may be used in the ac regulator 100. The gate drive signals are produced with reference to an ac input signal received at a live input 14 and a neutral input 16. Logic is provided such that the gate drive signals may have either high or low states. Moreover, the driver circuit 10 is arranged so that when the output at terminal 12*a* is high, the output at terminal 12*b*, is low, and vice versa. The states of the outputs at terminals 12*a,b* switch from high to low or vice versa as the ac input signal changes from positive to negative and back again such that the outputs at terminals 12*a,b* are never both high. Further details on exactly when the switching is made are provided in one of the following sections.

As can be seen from FIG. 7, the logic part of the driver circuit may comprise a pair of NOT gates 18*a,b*. In this example, NOT gate 18*a* is the master logic gate. A shunt 20 including a capacitor 22 may extend around the NOT gates 18*a,b* to improve the responsiveness of the driver circuit. The output of NOT gate 18*a* provides the output at terminal 12*a*, and is also passed to NOT gate 18*b* where it is inverted to provide the output on terminal 12*b*. Hence, the outputs appearing at terminals 12*a,b* are a combination of high and low, as primarily controlled by the output of the master logic gate, NOT gate 18*a*.

The circuit 10 may also include three transistors Q1, Q2 and Q3, all arranged to provide shunts to ground 24. Transistor Q3 may be switched between on and off to determine whether a current flows to the input of NOT gate 18*a* and this determines the states of the gate drive signals. Transistor Q1 may be provided to clamp the live terminal 14 to ground 24 when the ac input signal is negative. Similarly, Q2 may be provided to clamp the neutral terminal 16 to ground 24 when the ac input signal is positive.

The operation of this exemplary driver circuit 10 is as follows. Assume as a starting point that the live terminal 14 is positive on the rising side of a positive half-cycle and the neutral terminal 16 is negative on the falling side of the negative half-cycle. Then, the positive live terminal 14 sees current flow to Q3 such that it is conducting. Thus, current from a DC power supply 26 flows through transistor Q3 to ground 24 rather than flowing to NOT gate 18a. Thus, the input to NOT gate 18a is low and its output is high. This output is seen at output terminal 12a such that the output at 12a is high. The high output from NOT gate 18a becomes the input to NOT gate 18b, such that NOT gate 18b produces a low output that is seen at terminal 12b.

A feedback loop 28 passes the high output from NOT gate 18a to the base of transistor Q2, such that transistor Q2 is conducting. Thus Q2 provides a shunt that clamps the neutral terminal 15 to ground 24. The neutral terminal 16 is also connected to transistor Q1 that is thus off in view of the shunt through transistor Q2. Of course, transistor Q1 being off ensures current from the live terminal 14 flows to transistor Q3 rather than flowing straight to ground 24.

As the polarity of the ac input signal changes, the live terminal 14 goes to zero and then negative with respect to neutral terminal 16. Hence, current flow to transistor Q3 fails and it turns off. With Q3 off, current from the DC supply 26 flows to NOT gate 18a. With a high input, NOT gate 18a produces a low output that is seen at terminal 12a. The low output from NOT gate 18a is inverted by NOT gate 18b to become a high output at terminal 12b. The low output from NOT gate 18a is seen at the base of transistor Q2 via feedback loop 28, such that transistor Q2 switches off. With the neutral terminal 16 no longer clamped to ground 24 and becoming increasingly positive, current flows to transistor Q1 to turn it on. With Q1 conducting, the live terminal 14 is clamped to ground 24.

As the polarity of the ac input signal changes again, the neutral input 16 falls to zero and so transistor Q1 switches off and diode D1 protects transistors Q1 and Q2 as neutral terminal 16 becomes negative with respect to the positive terminal 14. Thus, live terminal 14 is no longer clamped to ground 24. As the live terminal 14 becomes positive, Q3 switches on so that the input to NOT gate 18a becomes low, and the states seen at output terminals 12a,b reverse. The high output from NOT gate 18a is fed to transistor Q2 that turns on to clamp the neutral terminal 16 to ground 24.

The clamping cycles may be looked at another way. When live terminal 14 is positive with respect to the neutral terminal 16 (i.e. during the positive half-cycle of the ac input signal), then the neutral input 16 is clamped to ground 24 as the reference (0V) level via transistor Q2. Similarly, when the neutral input 14 is negative with respect to the live input 16 (the negative half-cycle), the live input 14 is clamped to ground 24 as the reference level via transistor Q1. By restricting the reference level switching to a region within about one volt of zero volts and coordinating this changeover with the transitions of the drive signals appearing at output terminals 12a,b, this driver protects itself and the also the drive devices (e.g. transistors) from damage due to reverse polarity connections.

Figure 8:
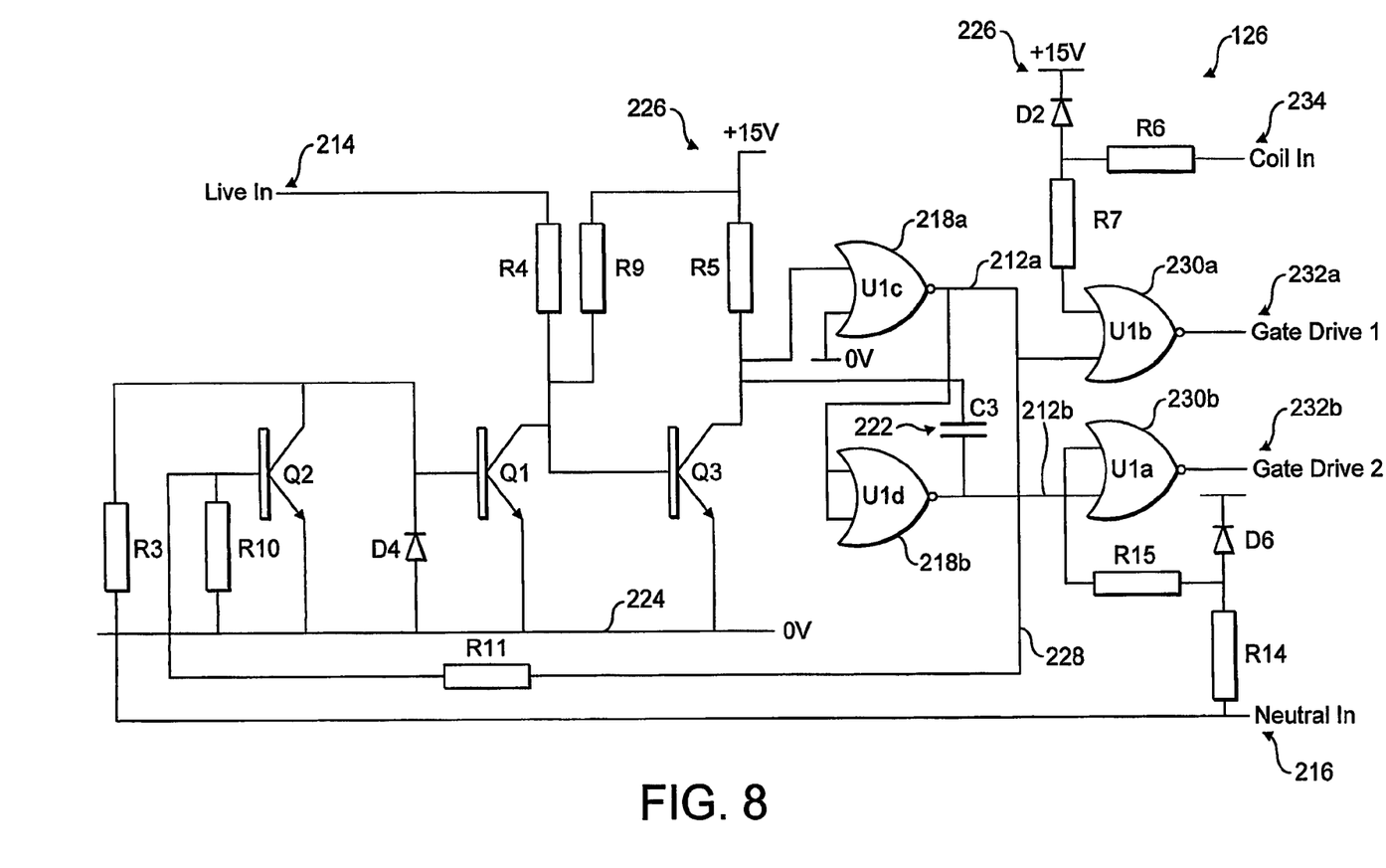
FIG. 8 is a circuit diagram of a clamp switching controller.

Turning now to the specific implementation of the general circuit of FIG. 7, FIG. 8 shows the clamp switching controller 126 in detail. In this example, the clamp switching controller 126 receives a +15V dc signal from the clamp PSU 142, as will be described below. As can be seen, the clamp switching controller of FIG. 8 essentially corresponds to the driver circuit 10 of FIG. 7. Similar reference numerals are used for similar parts, except incremented by 200.

One difference with the circuit of FIG. 8 is that the logic is implemented using NOR gates rather than NOT gates. To ensure NOR gates 218a,b function as NOT gates, their inputs are arranged in two well-known configurations. For NOR gate 218a, the second input is tied to ground 224. For NOR gate 218b, the same signal (the output from NOR gate 218a) is supplied to both inputs. These arrangements could be swapped, or the same arrangement could be used for both NOR gates 218a,b. The outputs from the NOR gates 218a,b are indicated at 212a,b. These outputs 212a,b are no longer seen as output terminals but are passed to further NOR gates 230a,b whose function will be described below.

As will be clear from the preceding description, during the positive half-cycle when the live terminal 214 is positive, output 212a is high and output 212b is low. At this time, transistor Q3 is on to hold the input to NOR gate low, transistor Q2 is on to clamp the neutral terminal 216 to ground 224 and transistor Q1 is off to ensure that the live terminal 214 is not clamped to ground 224. During the negative half-cycle when the neutral terminal 216 is positive, output 212a is low and output 212b is high. At this time, transistor Q3 is off to allow the input to NOR gate to be high and transistor Q2 is off both ensuring that the neutral terminal 216 is not clamped to ground 224 and allowing Q1 to turn on to clamp the live terminal 214 to ground 224.

The additional NOR gates 230a,b are included to ensure that the two gate drive signals appearing at output terminals 212a,b cannot be activated while any residual voltage exists across the inductor 120 in the ac regulator 100. This protects the clamp transistors 118a,b from reverse voltages when the inductor 120 is discharging by ensuring that the clamp transistors 118a,b remain inoperable during this time.

In practice this is achieved by passing the output 212a to one input of NOR gate 230a whose other input is connected to the "top" end of the inductor coil 120 via coil terminal 234. Thus, a high output is only seen on output terminal 232a when no current flows from the inductor 120 and when the output at 212a is also low. As output 212a is low during the negative half-cycle, the gate drive signal at terminal 232a is passed to clamp transistor 118b such that shunt 116b is in place during the negative half-cycle to ensure clamping diode 114b is active. During the negative half-cycle output 212b is high and so the gate drive signal at terminal 232b is always low. This gate drive signal is supplied to clamp transistor 118a ensuring that it remains off and that clamping diode 114b remains active.

The output 212b is passed to one input of NOR gate 230b whose other input is connected to the neutral terminal 216 and so sees the voltage on the "back" end of the inductor coil 120. As a result, the gate drive signal appearing at terminal 232b is only high when both the inductor 120 has discharged in the positive half-cycle (when the output at terminal 212b is low). Thus, during the positive half-cycle, the high output at terminal 232b switches clamp transistor 118a on and the low output at terminal 232a ensures clamp transistor 118b is off. This ensures clamp diode 114a is active throughout the positive half-cycle.

At the beginning of each half-cycle, the outputs at 212a,b reverse but any remaining voltage across inductor 120 keeps both gate drive signals from appearing at terminals 232a,b off. Hence, both clamp transistors 118a,b remain off and hence protected until the inductor 120 is fully discharged.

Figure 9:
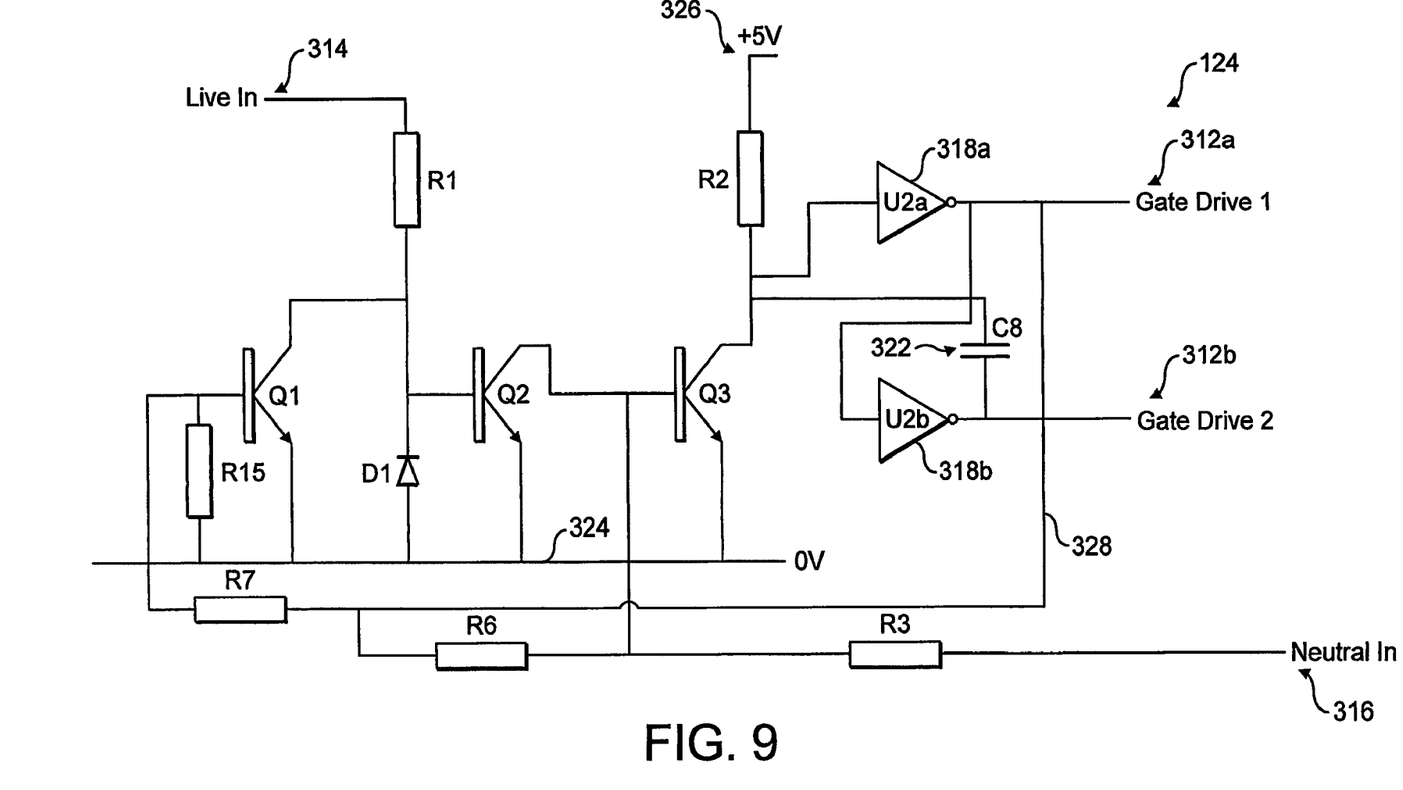
FIG. 9 is a circuit diagram of a modulator switching controller.

FIG. 9 shows the modulator switching controller 124 that receives a 12V supply from modulator PSU 132. This 5V supply may be obtained from the 12V provided by modulator PSU 132 in any standard fashion (in fact, the modulator PSU 132 is used to power other components requiring 12V, so hence this arrangement). The circuit is very similar to those of FIGS. 7 and 8, and so similar reference numerals will be used although incremented by 300 relative to FIG. 7. As the modulating transistors 110a,b are protected from reverse currents produced when the inductor 120 discharges (by virtue of the clamping diodes 114a,b), there is no need to include NOR gates or a reference to the voltage on the inductor 120. Also, the live terminal 314 and neutral terminal 316 are effectively reversed to ensure that the modulator switching controller 124 operates 180° out of phase with respect to the clamp switching controller 126.

Accordingly, the transistor Q1 still operates to clamp the live terminal 314 to ground 324, the transistor Q2 still operates to clamp the neutral terminal 316 to ground 324 and transistor Q3 operates to set the input to NOT gate 318a. Thus, when the neutral terminal 316 is positive with respect to the live input 314, it is seen at the base of transistor Q3 that is conducting. So, the current from modulator PSU 132 flows to ground 324, ensuring that the input to NOT gate 318a is low. This means that the output of NOT gate 318a is high and this is seen at output terminal 312a. The high output from NOT gate 318a is passed to NOT gate 318b ensuring that its output is low as seen on output terminal 312b. In addition, the high output from NOT gate 318a is passed along feedback loop 328 to hold transistor Q1 on. Thus, the live terminal 314 is clamped to ground 324 through transistor Q1. With the live terminal 314 clamped to ground, transistor Q2 is held off ensuring that the neutral terminal 316 is not clamped to ground.

When the ac input signal at live input 314 goes positive with respect to the neutral input 316, the neutral input 316 falls to zero thereby switching Q3 off. This sees the input to NOT gate 318a go high, resulting in a low output at terminal 312a and a high output at terminal 312b. The low output from NOT gate 318a is seen by transistor Q1 via feedback loop 328, and so transistor Q1 switches off. With Q1 switched off, the live terminal 314 is no longer clamped to ground 324 and its now positive-going potential sees Q2 switch on thereby clamping the neutral terminal 316 to ground 324.

So, during positive half-cycles, the gate drive signal at terminal 312a is low and the gate drive signal at terminal 312b is high. Conversely, during negative half-cycles, the gate drive signal at terminal 312a is high and the gate drive signal at terminal 312b is low. Terminal 312a is connected to modulating transistor 110b, while terminal 312b is connected to modulating transistor 110a. This ensures that modulating transistor 110a may be switched during the positive half-cycle (when terminal 312b is high) and modulating transistor 110b may be switched during the negative half-cycle (when terminal 312a is high). As described above, the gate drive signals are not supplied directly to the modulating transistors 110a,b, but are subject to the pulse width modulation by the PWM module 90 that produces the required regulated signal. Thus, the modulator switching controller 124 operates to control when the modulating transistors 110a,b may be switched by the PWM module 90 and to ensure the modulating transistors 110a,b are switched off at all other times.

The above embodiment uses drive signals that have high values to drive their connected transistors (or whatever other device they may drive). Of course, where devices operate under inverted logic (i.e. to require low drive signals to activate the devices rather than high signals), the above embodiments may be readily adapted to invert their logic outputs.
The Switching Controller PSU's The PSU's may draw power evenly from the ac input signal, e.g. from the ac signal supplied by the dchp unit. As can be seen from FIG. 6, the modulator PSU 132 may draw power from the neutral line 106 via an appropriately-biased diode 128 such that the modulator PSU 132 only receives power during the negative half-cycle of the ac input signal. Conversely, the clamp PSU 142 may draw power from the live line 104 via an appropriately-biased diode 130 such that the clamp PSU 142 only receives power during the positive half-cycle of the ac input signal Thus, the PSU's 132,142 may draw power during alternate half-cycles. Moreover, the PSU's 132,142 may draw power evenly to ensure the integrity of the ac signal from the dchp unit and yet may be capable of providing an asymmetric current waveform to the switching controllers 132,142. This obviates the need for power factor correction that would otherwise add complexity and expense.

Figure 10:
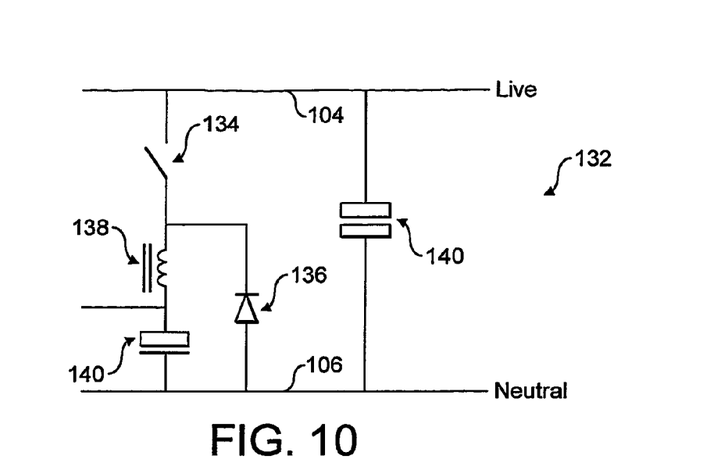
FIG. 10 is a circuit diagram for a power supply of one of the switching controllers of FIG. 6 that controls a pair of modulating transistors.

FIG. 10 shows an embodiment of the modulator PSU 132. As noted above, this PSU 132 may draw power during the negative half-cycle of the ac input signal. In this case, current flow is from neutral 106 to live 104. The modulating transistors 110a,b used in this embodiment require a maximum continuous current of 40 mA at a voltage of 12V dc. The 12V level may be obtained from the 240V input by using a switch 134 operated with a switching ratio of 20:1. A diode 136 and smoothing components (inductor 138 and capacitors 140) may be included to ensure a smooth 12V dc output. To supply the required average current of 40 mA, the modulator PSU 132 may draw a current of 80 mA when it operates during the negative half-cycle. The 20:1 switching ratio sees a current of 4 mA drawn from the ac input because the power must remain constant (remembering voltage drops from 240V to 12V across the switch).

Figure 11:
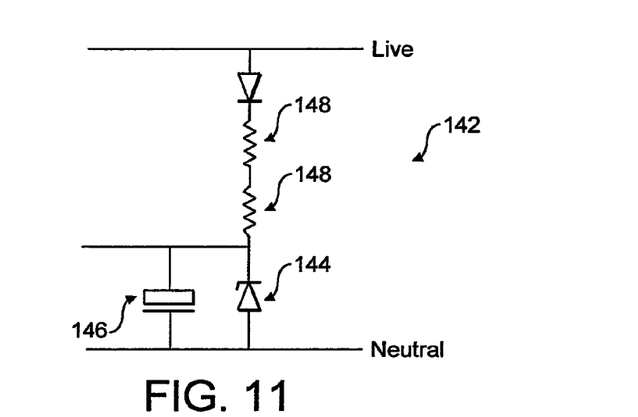
FIG. 11 is a circuit diagram for a power supply of one of the switching controllers of FIG. 6 that controls a pair of transistors associated with clamping diodes.

FIG. 11 shows the clamp PSU 142 for the clamp transistors 118a,b. As described above, this PSU 142 may draw power during the positive half-cycle of the ac input signal. The clamp transistors 118a,b require a significantly lower current as they switch far less frequently than the modulating transistors 110a,b. Specifically, the clamp transistors 118a,b require 1.8 mA maximum continuous, at 15 Vdc. As a result, a switching circuit like that of FIG. 10 is not favoured. Instead, a simple half-wave rectifying circuit may be used that may be shunt-regulated using a Zener diode 144 rated at the required 15V. The power consumption of this circuit is likely to be lower than that of FIG. 10 where the switch 134 is likely to be implemented as a field effect transistor.

The Zener diode 144 may be used to limit the voltage across the output to 15V, and the parallel capacitor 146 may be used to smooth the output and to store energy during the positive half-cycle for discharge during the negative half-cycle. The required average current of 1.8 mA may be obtained by drawing a 3.6 mA current during only the positive half-cycle. This 3.6 mA current may be obtained from the 240V input according to Ohm's Law using two 33 kΩ resistors 148 in series to provide the necessary 66 kΩ resistance.

Where these two different arrangements of the modulator PSU 132 and clamp PSU 142 are used, they ensure significantly different instantaneous currents may be provided to their associated transistors 110a,b, 118a,b, yet sill allowing power to be drawn evenly from the ac input signal.

Two specific examples of PSU's 132, 142 are provided above, although other PSU's may be used to power the transistors 100a,b, 118a,b. For example, both PSU's 132 and 142 may be switchers, or both may be linear. They may even share a common design. Alternatively, charge pumps may be used as PSU's to multiply or divide a voltage. A suitable example is the four-stage Dickson charge pump. Such a charge pump does not use inductors and so does not produce large magnetic fields that may otherwise cause interference.

Timing of Polarity Switching

The preceding sections described the switching controllers 124,126 that effect the change between positive and negative half-cycles, along with a description of their PSU's 132,142. This section describes how the exact timing of the change from positive switching to negative switching may be managed. This timing should be tightly controlled in order to avoid potential problems associated with the fact that the ac input signal is not likely to be a perfect sinusoidal signal. FIG. 11 shows an example of an uneven ac input signal that may be obtained, for example, from a dchp unit (albeit exaggerated for the purposes of illustration). Such an uneven signal may not make a single zero crossing when changing from positive to negative half-cycles and vice versa. As can be seen, noise on the signal may lead to three or more zero-crossings.

Switching should be tightly controlled around zero volts to ensure transistors 110a,b, 118a,b do not switch repeatedly which would be at best inefficient and may at worst damage the transistors 110a,b, 118a,b. In addition, switching of transistors 110a,b, 118a,b must be controlled to ensure that both transistors from either pair 110a,b or 118a,b are not switched on at the same time. In particular, the clamp transistors 118a,b should not be allowed to be switched on at the same time as a short circuit would form along shunts 116a,b from live 104 to neutral 106.

In order to avoid these problems, a switching regime may be implemented that creates a "dead zone" around zero volts in which no switching is permitted. To this end, a pair of offsets may be used for each polarity change: $-V_1$ and $-V_{switch}$ for positive to negative switches, and $+V_1$ and $+V_{switch}$ for negative to positive switches. These offsets are shown in FIG. 11.

The $\pm V_1$ offsets creates the dead zone such that a "zero volts" condition is met whenever the voltage between the live and neutral inputs falls within the narrow band between $\pm V_1$. Any transitions between positive and negative caused by fluctuations in the ac input signal as it crosses through zero volts that remain within this band are not distinguishable from zero as far as the circuit is concerned. To this end, the values for $\pm V_1$ may be chosen to be greater than the background signal noise level.

The onset of active switching of the transistors 110a,b, 118a,b occurs when the voltage of the ac input signal exceeds $\pm V_{switch}$. Active switching is stopped once the ac input signal falls and crosses the $\pm V_1$ offsets. The offsets create a band between $+V_1$ & $+V_{switch}$ (for positive signals) and a band between $-V_1$ & $-V_{switch}$ (for negative signals) that provide hysteresis to eliminate "hunting" (the rapid repeated enabling and inhibiting of switching that would otherwise be caused by the ac input signal fluctuating above and below a single actuation level). These bands may be set so that they are greater than the anticipated noise magnitude.

Starting in a positive half-cycle, modulating transistor 110a will be active and switching to regulate the ac input signal according to the PWM scheme. Modulating transistor 110b is off. Clamp transistor 118a is on and clamp transistor 118b is off to ensure clamping diode 114a is effective. As the ac input signal falls towards zero volts, both modulating transistor 110a and clamp transistor 118a switch off as the $+V_1$ threshold is crossed. Hence, all transistors 110a,b, 118a,b are now switched off in advance of the ac input signal crossing zero volts. Inductor 120 will discharge once the ac input signal crosses zero volts and so the offsets help to ensure switching does not commence before the inductor 120 has discharged fully. As discussed above, the clamp switching controller 126 is the fail safe in this respect as the gate drive signals are controlled by logic gates 232a,b such that neither can go high until the voltage across the inductor 120 falls to zero.

As the ac input signal goes increasingly negative, it crosses the first offset $-V_1$. This may cause the switching controllers 124,126 to switch from positive to negative mode, i.e. the states of transistors Q1, Q2 and Q3 switch and the live terminals 214,314 become clamped to ground 224,324. While the switching controllers 124,126 are now ready for operation, the gate drive signals are maintained at low until the second offset $-V_{switch}$ is crossed. After this crossing, clamp switching controller 126 may send a high drive signal to switch clamp transistor 118b on, thereby making clamping diode 114b effective. Subsequently, clamp switching controller 124 may set a high drive signal to allow modulating transistor 110b to begin switching according to the required pulse width modulation scheme. To ensure that clamp transistor 118b switches on before modulating transistor 110b, $-V_{switch}$ for the clamp transistor 110b may be set closer to zero volts then $-V_{switch}$ for the modulating transistor 110b.

When the ac input signal starts to fall once more, switching is only stopped once the $-V_1$ offset is crossed.

As will be appreciated, the reverse protocol may be used when the ac input signal switches from negative to positive. Briefly, the modulating transistor 110b and the clamp transistor 118b switch off, zero volts is crossed, $+V_1$ is reached at which point switching controllers 124,126 go from negative to positive (Q1, Q2 and Q3 switch, neutral 216,316 is clamped to ground 224,324), and finally $+V_{switch}$ is reached that first causes clamp transistor 118a to switch on followed by modulating transistor 110a.

Figure 12:
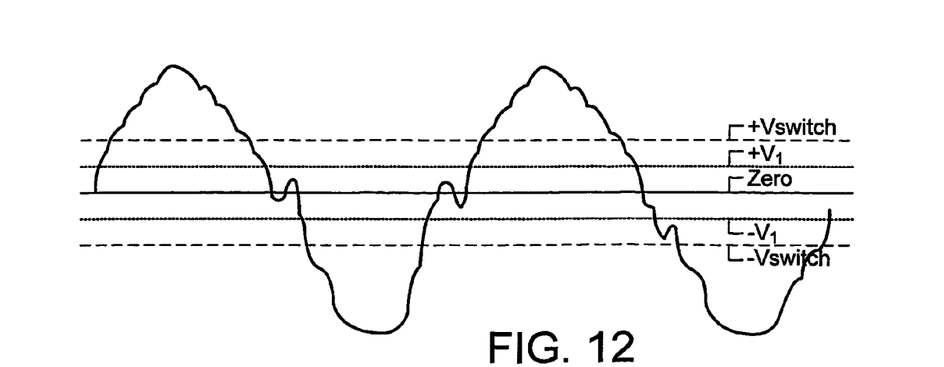
FIG. 12 is a graph showing an uneven ac input signal and offsets used when changing from positive to negative switching and back again.

FIG. 12 shows example values for $\pm V_1$ and $\pm V_{switch}$. In practice, these values may be varied. As mentioned above, different values may be used for the modulator switching controller 124 and for clamp switching controller 126, such as different values for $\pm V_{switch}$ to ensure that the clamp transistors 118a,b are on before the modulating transistors 110a,b start switching. While FIG. 12 shows the pairs of offsets $\pm V_1$ and $\pm V_{switch}$ symmetrically offset from zero volts, this need not be the case. For example, $+V_1$ may have a different magnitude to $-V_1$ due to the effects of instantaneous unbalanced power drains that are used by the PSU's 132,142. As will be remembered, although the average power taken from positive to negative half-cycles is balanced, there may be variations in the instantaneous levels.

The exact implementation of this switching scheme using the switching controllers 124,126 is dependent on selection of component values that take into account device characteristics such as transistor and diode voltage drops, current amplification factors and voltage switching characteristics. It would be straightforward for a person skilled in the art to determine appropriate choices of components and component values, either by calculation, empirical measurement or both.

Regulation of the ac Input Signal

Figure 13A:
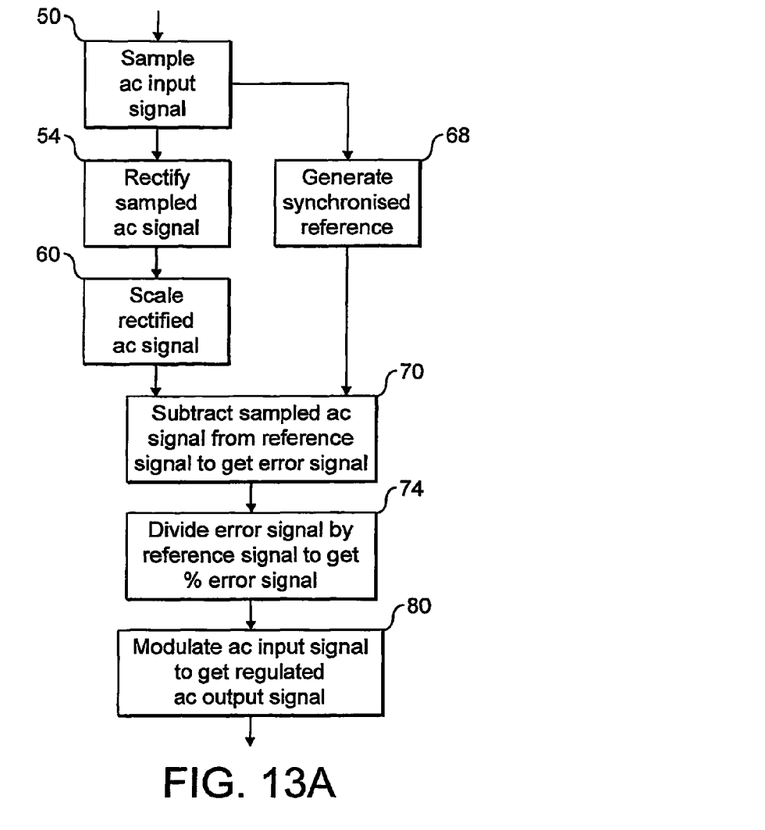
FIG. 13a is a block diagram of a method of regulating an ac signal according to an embodiment of the present invention.
Figure 13B:
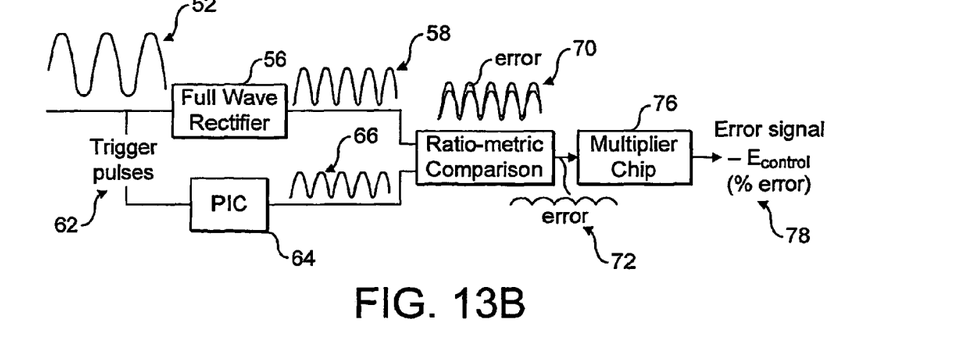

The method by which regulation of the ac input signal is performed by the voltage comparator 92 or current comparator 94 in conjunction with the PWM module 90 will now be described with reference to FIGS. 13a and 13b. Essentially, both the voltage comparator 92 and the current comparator 94 operate in similar fashion. This is because although the current comparator 94 operates to regulate current, it implements this by monitoring the voltage across a resistance (i.e. it effects current control indirectly through voltage control). Thus, the following description applies to both operation of the voltage comparator 92 and the current comparator 94.

The regulator assembly 101 regulates the ac input signal to provide the ac output signal. At 50, the ac input signal is sampled to produce a sampled ac signal as an input waveform 52. In fact, a feedback loop provides a reference to the output signal and this may also be sampled at 50. Consequently, the sampled ac signal reflects the ac input signal and is modified to correct for inaccuracies introduced into the output signal downstream.

The sampled ac signal 52 may be full-wave rectified at 54 by a full-wave rectifier 56 to produce the rectified ac signal. The rectified ac signal may then be scaled at 60 with reference to a desired output voltage, 230V rms in this example, to produce a scaled ac signal 58.

In parallel, the sampled ac signal 52 may be used to generate trigger pulses 62 to coincide with the sampled ac signal 52 crossing through zero volts. This zero crossing may be detected using software, and may use digital filtering to remove the effects of noise around the zero crossing and make use of software pattern matching to improve phase synchronisation. A computer 64 uses these trigger pulses 62 to generate a synchronised reference signal 66, as shown at 68. The reference signal 66 corresponds to a sinusoid, but with only positively extending lobes such that it is equivalent to a full-wave rectified ac signal. The reference signal 66 is synchronised to the sampled ac signal 52 using the trigger pulses 62 such that the reference signal 66 touches zero volts in synchrony with the scaled ac signal 58 touching zero volts.

This sinusoidal reference signal 66 is generated using a lookup table to supply values to a digital to analogue converter. Only values relating to the part of a sinusoid form 0 to π/2 radians are stored: these values are used in reverse for the π/2 to n radians part, and this shape is repeated for the π to 2 π radians part.

At 70, the scaled ac signal 58 may be subtracted from the reference signal 66 to produce an error signal 72 (i.e. instantaneous values are subtracted from instantaneous values). To ensure that only positive values are obtained, an offset is introduced. For example, this subtraction may be implemented in a difference amplifier operating with a suitable offset. Thus, the error signal 72 contains only positive values.

As can be seen, this error signal 72 is a function of the phase of the ac input signal. This phase variation may be removed at 74 by a multiplier chip 78 that operates to divide the error signal by the reference signal 66 to provide a % error signal 78. This % error signal 78 may then be used at 80 to modulate the ac input signal. As both reference signal 66 and error signal 72 are positive, the multiplier chip 78 need only operate in one quadrant. This vastly simplifies the cost and complexity of the multiplier chip 78. Moreover, other advantages are obtained by using this single quadrant operation. For example, cross-over distortion and linearity mismatch that are inherent when switching between quadrants (i.e. as one input changes polarity) are avoided. Moreover, any DC offset present in the ac input signal that may otherwise alter the operating characteristics of reactive components (such as interference filter chokes) is applied equally to both half-cycles as they are both treated as positive going. Thus the overall waveshape with reference to zero volts is unchanged: if applied to positive and negative half-cycles. The feedback loop also compensates for any DC offsets introduced by the regulator itself.

The modulation may be performed according to a pulse width modulation scheme to modulate out any error in the signal. For example, the % error signal 78 may be compared to a ramp signal to cause pulse widths to be defined by where the ramp signal and the % error signal 78 cross. For example, where the regulator is producing the required ac output signal, the reference signal will match the sampled ac signal (after rectifying and scaling) such that a zero % error signal results. This will cause a full width pulse in the modulation such that the voltage of the ac input signal is unchanged. This situation is unusual as the input ac signal will generally have a greater magnitude than that required for the ac output signal. Hence, it is far more common for the voltage of the input ac signal to be more than that required. This is reflected in the sampled ac signal and a % error signal 78 results that causes smaller pulses. The smaller pulses modulate the input ac signal to pull down the voltage of the ac output signal to the required level.

The magnitude of the reference signal 66 and the degree of scaling of the sampled ac signal 52 is chosen so that a zero % error signal 78 results when the ac input signal is at a desired 230V rms. An advantage of the present invention is its flexibility: generation of the reference signal 66 and the scaling may be varied to suit any desired output voltage, for example to suit the local electrical grid.

It will be evident that modifications may be made to the above. For example, a scaling of the ac input signal relative to the reference signal 66 is required and so the scaling may be performed on the ac input signal, the reference signal 66 or both. Also, scaling may be performed only after the division at 74. For example, the % error may be passed to an amplifier for scaling.

It will be clear to the skilled person that variations may be made to the above embodiments without necessarily departing from the scope of the invention that is defined by the appended claims.

The above regulator assembly 101 has been described in the context of regulating an ac supply provided by a Stirling engine in a dchp unit for use by domestic appliances. However, regulators according to the present invention may find useful application elsewhere. Essentially, the regulator assembly 101 is designed to operate downstream of any voltage source such as a generator, a mains supply, etc.

For example, the regulator assembly 101 may be used to buffer the interface between a Stirling engine alternator and the mains supply to prevent voltage and current transients and steady state variations that may otherwise cause disruptive fluctuations in the output waveform. Such an arrangement reduces the likelihood of engine shutdowns being initiated by the control system, as a safety precaution, in response to loss of quality of the grid supply.

A welcome advantage of the regulator assembly 101 according to the present invention is that it allows connection between a stand-alone generator and its loads (such as connected appliances) in any country or market whatever its electrical grid constraints. By providing a means to set the voltages for a range of possible grid and engine frequencies, the switching regulator can provide suitable voltage/frequency models for use in equipment matched to different markets and their grids.

The regulator assembly 101 can be used outside of the context of dchp units. For example, the regulator assembly 101 may be used as buffer between a mains power supply and domestic circuitry such as a lighting circuit. By controlling the voltage waveform, the power consumed can be adjusted to compensate for instantaneous surges in current demand, improve power factor and provide cost savings from improved electrical efficiency, without noticeable effects. Waveform control can also be used to mitigate against fluctuations due to poor quality of supply or due to peak current demands of high crest factor loads. Indeed, the regulator assembly 101 may be employed to ensure ignition and then provide dimming of fluorescent lighting, that cannot be achieved conventionally.

A further application of the regulator assembly 101 according to the present invention is to connect a mains supply and an electric motor. The regulator assembly would then operate as a very low cost, simple power economiser and controller, giving lower motor losses compared to normal drives.

The invention claimed is:

1. A switching regulator for regulating an ac signal, the regulator comprising:
    input terminals for receiving an input ac signal; output terminals for providing an output signal; an inductor and a capacitor arranged to smooth the output signal appearing at the output terminals; a positive half-cycle part and a negative half-cycle part arranged to regulate the positive and negative half-cycles respectively of the input ac signal;
    each of the positive and negative half-cycle parts comprising:
        a modulating transistor operable to modulate the respective half-cycle of the input ac signal and having an associated modulator diode arranged to allow current flow through the modulating transistor during that modulating transistor's respective half-cycle and to resist current flow through the modulating transistor during the other half-cycle; and a clamping diode arranged to protect the modulating transistor from reverse-bias voltages and having an associated clamp switch operable to cause the clamping diode to conduct during that modulating transistor's respective half-cycle and to cause the clamping diode to be bypassed during the other half-cycle;
    the regulator further comprising:
        a first switching controller operable to cause the modulating transistors to switch, comprising a first power supply operable to take power from one half-cycle of the input ac signal; and
        a second, separate switching controller operable to cause the clamp switches to switch, comprising a second power supply operable to take power from the other half-cycle of the input ac signal.

2. The switching regulator of claim 1, wherein the modulator diodes are arranged to provide a shunt around their associated modulating transistor.

3. The switching regulator of claim 1, wherein the first switching controller is operable to cause the modulating transistors to switch to provide pulse width modulation of the input ac signal.

4. The switching regulator of claim 1, wherein the clamp switches are transistors.

5. The switching regulator of claim 4, wherein the clamp transistors are arranged on respective shunts thereby bypassing, when conducting, their associated clamping diode.

6. The switching regulator of claim 1, wherein the first and second power supplies are arranged to draw substantially equal average quantities of power from the input ac signal.

7. The switching regulator of claim 6, wherein the first and second power supplies are arranged to provide substantially different instantaneous currents to the first and second switching controllers respectively.

8. The switching regulator of claim 7, wherein at least one of the first and second power supplies decrease the voltage of the signal drawn from the input ac signal.

9. The switching regulator of claim 8, wherein the at least one power supply comprises a switch operable to decrease the voltage.

10. The switching regulator of claim 8, wherein the at least one power supply comprises a Zener diode arranged to provide the reduced voltage.

11. The switching regulator of claim 8, wherein at least one of the first or second power supplies comprises resistors rated to provide a required current.

12. The switching regulator of claim 1, wherein at least one of the first or second power supplies comprises smoothing components such as an inductor and/or a capacitor.

13. The switching regulator of claim 1, wherein at least one of the first or second power supplies comprises a capacitor operable to store energy during one half-cycle and to release energy during the other half-cycle.

14. The switching regulator of claim 1, wherein the first switching controller and/or the second switching controller has an associated diode arranged to allow only either the positive or the negative half-cycle of the input ac signal to flow to the first or second power supply respectively.

15. The switching regulator of claim 14, wherein both the first and the second switching controllers have associated diodes that are arranged to be oppositely biased such that one of the power supplies receives the positive half-cycle of the input ac signal and the other of the power supplies receives the negative half-cycle of the input ac signal.

16. The switching regulator of claim 1, wherein the first switching controller includes a first power supply that is operable to take power from the input ac signal and supply it to the modulating transistors.

17. The switching regulator of claim 1, wherein the second switching controller includes a second power supply that is operable to take power from the input ac signal and supply it to clamp transistors operating as the clamp switches.

18. A method of providing power to the switching regulator of claim 1, comprising:
    powering the first switching controller by drawing power from one half-cycle of the input ac signal; and
    powering the second switching controller by drawing power from the other half-cycle of the input ac signal;
    wherein the average power drawn during each half-cycle is substantially the same.

19. The method of claim 18, further comprising using the first switching controller to provide current to the modulating transistors, and using the second switching controller to provide current to the clamp switches, wherein the instantaneous currents provided by the first and second switching controllers are substantially different.

20. A domestic combined heat and power unit comprising an alternator and the switching regulator of claim 1, wherein the switching regulator is arranged to receive the signal provided by the alternator as the input ac signal.

21. The unit of claim 20 connected to an electrical grid, wherein the switching regulator is arranged to provide the output signal to the electrical grid.

22. The unit of claim 20 having at least one electrical appliance connected thereto, wherein the switching regulator is arranged to provide the output signal to the electrical appliance.

23. A dimmer switch for fluorescent lighting comprising any of the switching regulators of claim 1.

* * * * *